(12) United States Patent
Chae

(10) Patent No.: US 11,508,358 B2
(45) Date of Patent: Nov. 22, 2022

(54) ARTIFICIAL INTELLIGENCE APPARATUS AND METHOD FOR RECOGNIZING SPEECH IN CONSIDERATION OF UTTERANCE STYLE

(71) Applicant: LG Electronics Inc., Seoul (KR)

(72) Inventor: Jonghoon Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 398 days.

(21) Appl. No.: 16/709,087

(22) Filed: Dec. 10, 2019

(65) Prior Publication Data

US 2020/0111482 A1 Apr. 9, 2020

(30) Foreign Application Priority Data

Sep. 30, 2019 (KR) .................. 10-2019-0120950

(51) Int. Cl.
*G10L 15/00* (2013.01)
*G10L 15/16* (2006.01)
*G10L 15/06* (2013.01)
*G06K 9/62* (2022.01)
*G06N 3/08* (2006.01)
*G06N 20/10* (2019.01)
*G06N 3/04* (2006.01)

(52) U.S. Cl.
CPC ............ *G10L 15/16* (2013.01); *G06K 9/6218* (2013.01); *G06N 3/0454* (2013.01); *G06N 3/08* (2013.01); *G06N 20/10* (2019.01); *G10L 15/063* (2013.01); *G10L 2015/0631* (2013.01)

(58) Field of Classification Search
CPC ....... G10L 15/16; G10L 15/063; G10L 15/32; G10L 15/06; G10L 15/14; G10L 15/02; G10L 15/04; G10L 15/18; G10L 25/51; G10L 25/2015; G10L 25/17; G10L 2015/0631; G06K 9/6218; G06K 9/00523; G06K 9/00536; G06N 3/0454; G06N 3/08; G06N 20/10; G06N 3/006; G06N 3/0427; G06V 10/762
See application file for complete search history.

(56) References Cited

U.S. PATENT DOCUMENTS

| | | | |
|---|---|---|---|
| 9,401,143 B2 * | 7/2016 | Senior .................... | G10L 15/183 |
| 11,238,842 B2 * | 2/2022 | Zhao .................... | G10L 15/1807 |
| 2017/0076727 A1 * | 3/2017 | Ding ........................ | G10L 17/04 |
| 2020/0160838 A1 * | 5/2020 | Lee .......................... | G10L 15/02 |
| 2020/0168230 A1 * | 5/2020 | Roh ......................... | G10L 17/14 |

* cited by examiner

*Primary Examiner* — Edgar X Guerra-Erazo
*Assistant Examiner* — Philip H Lam
(74) *Attorney, Agent, or Firm* — Fish & Richardson P.

(57) ABSTRACT

Disclosed herein an artificial intelligence apparatus for recognizing speech in consideration of an utterance style including a microphone, and a processor configured to obtain, via the microphone, speech data including speech of a user, extract an utterance feature vector from the obtained speech data, determine an utterance style corresponding to the speech based on the extracted utterance feature vector, and generate a speech recognition result using a speech recognition model corresponding to the determined utterance style.

9 Claims, 16 Drawing Sheets

ARTIFICIAL INTELLIGENCE APPARATUS AND METHOD FOR RECOGNIZING SPEECH IN CONSIDERATION OF UTTERANCE STYLE

CROSS-REFERENCE TO RELATED APPLICATIONS

This application claims priority to Korean Patent Application No. 10-2019-0120950 filed on Sep. 30, 2019 in Korea, the entire contents of which is hereby incorporated by reference in its entirety.

BACKGROUND

The present disclosure relates to an artificial intelligence (AI) apparatus and method for recognizing speech in consideration of an utterance style, and more particularly, to an artificial intelligence apparatus and method for recognizing speech of a user using a speech recognition model suitable for the utterance style of the speech of the user.

Recently, apparatuses for performing control by receiving sound are increasing. Apparatuses such as artificial intelligence speakers or smartphones for providing a speech recognition function recognize speech uttered by users and perform control corresponding to a result of recognition or provide a response.

Speech recognition performance is greatly affected by speech features such as tone, intonation, etc. Since utterance styles of uttered speech differ between users, if a single speech recognition model is used, it is difficult to accurately recognize speeches of various speech styles. If a speech recognition model suitable for the utterance style of uttered speech is used, speech recognition accuracy may increase.

SUMMARY

An object of the present disclosure is to provide an artificial intelligence apparatus and method for recognizing speech using a speech recognition model suitable for the utterance style of uttered speech when recognizing the uttered speech of a user.

An object of the present disclosure is to provide an artificial intelligence apparatus and method for learning a speech recognition model suitable for an utterance style of uttered speech of a user when there is no speech recognition model suitable for the utterance style of the uttered speech of the user and recognizing speech using the learned speech recognition model.

According to an embodiment, provided are an artificial intelligence apparatus and method for obtaining speech data including speech of a user, extracting an utterance feature vector from the speech data, determining an utterance style corresponding to the extracted utterance feature vector, and generating a speech recognition result using a speech recognition model corresponding to the determined utterance style.

According to an embodiment, provided are an artificial intelligence apparatus and method for determining an utterance style corresponding to speech data as a new utterance style if an utterance feature vector extracted from speech differs significantly from utterance features corresponding to previously learned utterance styles, generating training data corresponding to the new utterance style using the extracted utterance feature vector, learning a speech recognition model corresponding to the new utterance style using the generated training data, and generating a speech recognition result corresponding to speech using the learned speech recognition model.

BRIEF DESCRIPTION OF THE DRAWINGS

The present disclosure will become more fully understood from the detailed description given herein below and the accompanying drawings, which are given by illustration only, and thus, are not limitative of the present disclosure, and wherein.

DETAILED DESCRIPTION OF THE EMBODIMENTS

Figure 1:
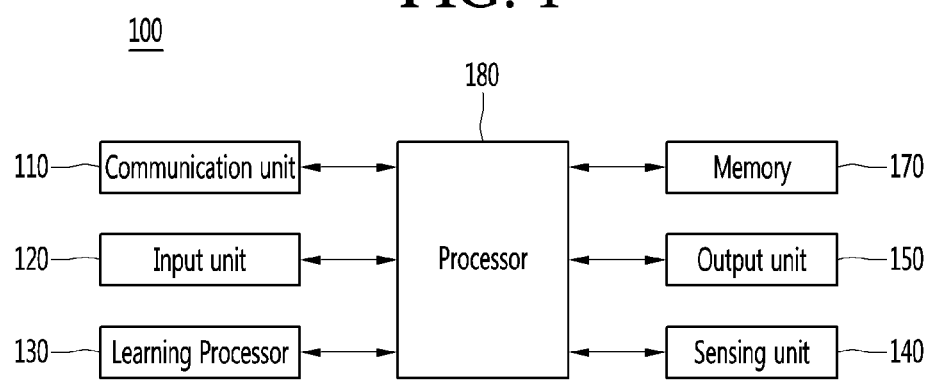
FIG. 1 is a block diagram illustrating an AI apparatus according to an embodiment of the present disclosure.

Hereinafter, embodiments of the present disclosure are described in more detail with reference to accompanying drawing's and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

Here, the self-driving vehicle may be regarded as a robot having a self-driving function.

<Extended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present disclosure.

Hereinafter, the AI apparatus 100 may be referred to as a terminal.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a digital multimedia broadcasting (DMB) receiver, a radio, a washing machine, a refrigerator, a desktop computer, a digital signage, a robot, a vehicle, and the like.

Referring to FIG. 1, the AI apparatus 100 may include a communication unit 110, an input unit 120, a learning processor 130, a sensing unit 140, an output unit 150, a memory 170, and a processor 180.

The communication unit 110 may transmit and receive data to and from external devices such as other 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

Here, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a training data for model learning and an input data to be used when an output is acquired by using learning model. The input unit 120 may acquire raw input data. Here, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing unit 140 may acquire at least one of internal information about the AI apparatus 100, ambient environment information about the AI apparatus 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

Here, the output unit 150 may include a display unit for outputting time information, a speaker for outputting auditory information, and a haptic module for outputting haptic information.

The memory 170 may store data that supports various functions of the AI apparatus 100. For example, the memory 170 may store input data acquired by the input unit 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
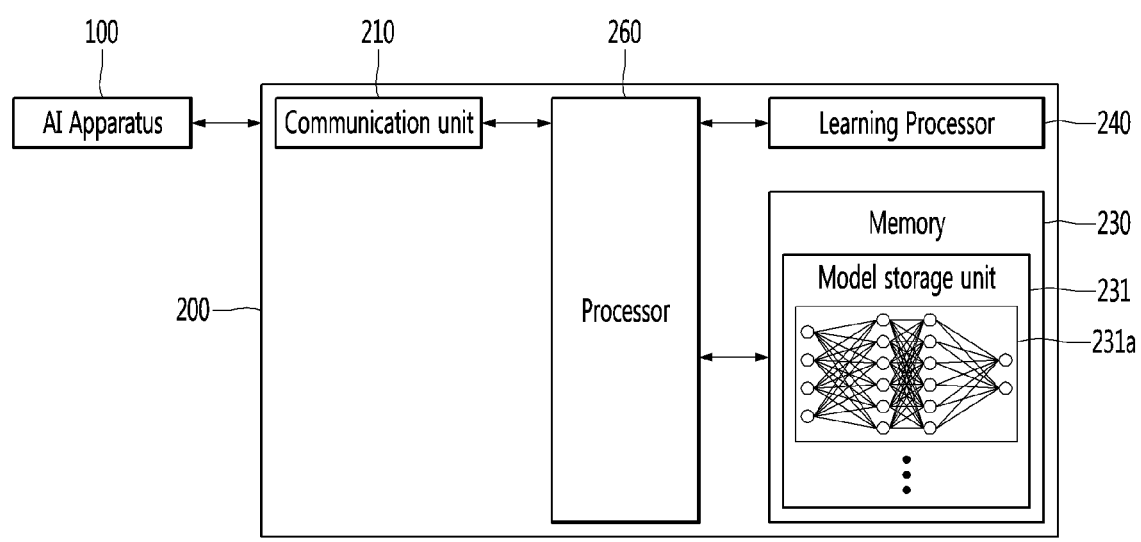
FIG. 2 is a block diagram illustrating an AI server according to an embodiment of the present disclosure.

FIG. 2 is a block diagram illustrating an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. Here, the AI server 200 may be included as a partial configuration of the AI apparatus 100, and may perform at least part of the AI processing together.

The AI server 200 may include a communication unit 210, a memory 230, a learning processor 240, a processor 260, and the like.

The communication unit 210 can transmit and receive data to and from an external device such as the AI apparatus 100.

The memory 230 may include a model storage unit 231. The model storage unit 231 may store a learning or learned model (or an artificial neural network 231a) through the learning processor 240.

The learning processor 240 may learn the artificial neural network 231a by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
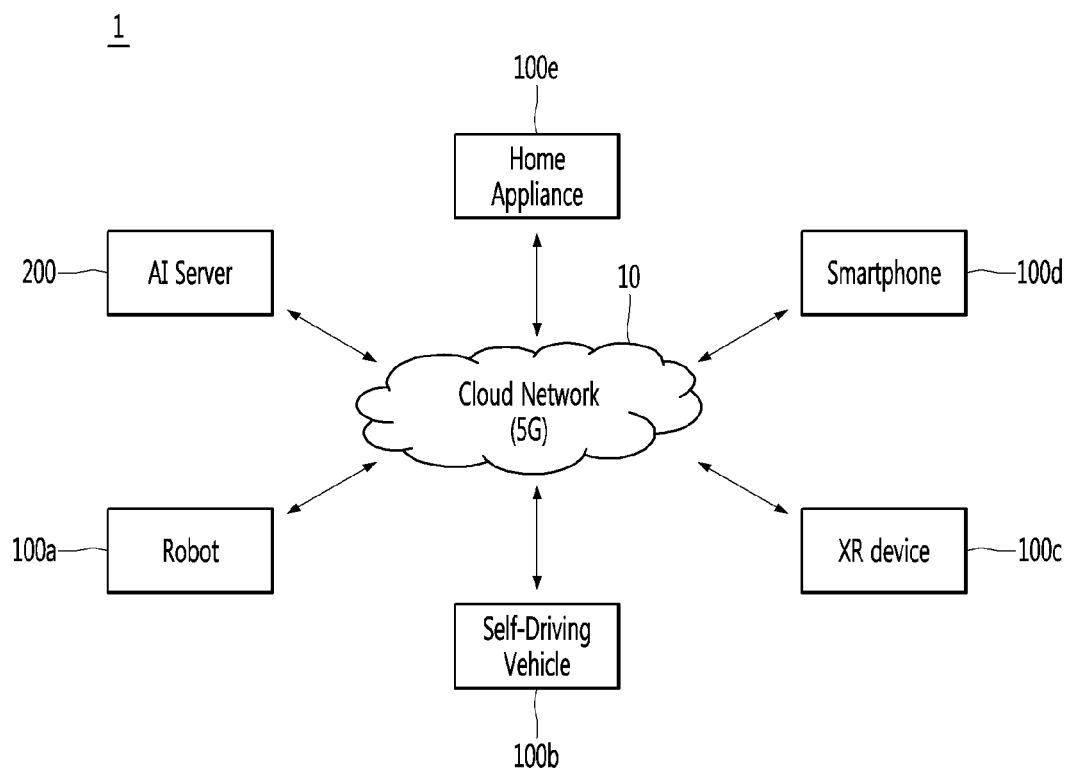
FIG. 3 is a view illustrating an AI system according to an embodiment of the present disclosure.

FIG. 3 is a view illustrating an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

Here, the AI server 200 may learn the artificial neural network according to the machine learning algorithm instead of the AI apparatuses 100a to 100e, and may directly store the learning model or transmit the learning model to the AI apparatuses 100a to 100e.

Here, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

Here, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external device to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. Here, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling route by using the recognized surrounding information or object information. The learning model may be learned directly from the self-driving vehicle 100a or may be learned from an external device such as the AI server 200.

Here, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external device to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. Here, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

Here, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given route without the user's control or moves for itself by determining the route by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

Here, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include a HUD to output an XR image, thereby providing a passenger with a real object or an XR object corresponding to an object in the screen.

Here, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
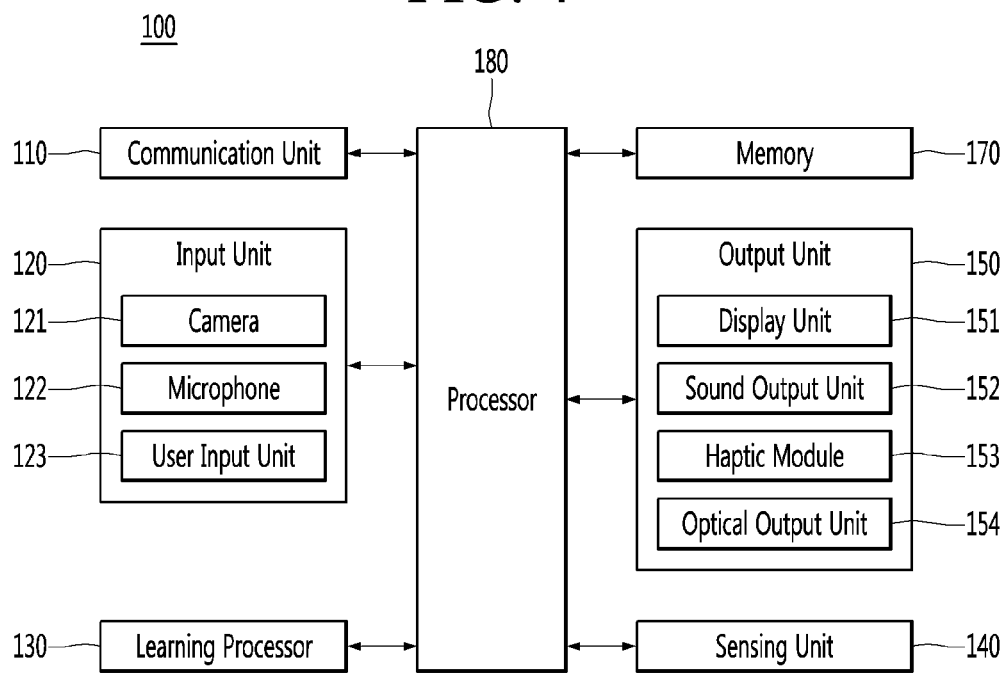
FIG. 4 is a block diagram illustrating an AI apparatus according to an embodiment of the present disclosure.

FIG. 4 is a block diagram illustrating an AI apparatus 100 according to an embodiment of the present disclosure.

The redundant repeat of FIG. 1 will be omitted below.

The communication unit 110 may also be referred to as a communication modem or a communication circuit.

Referring to FIG. 4, the input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the AI apparatus 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the AI apparatus 100 to correspond to the inputted information.

The user input unit 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

The sensing unit 140 may also be referred to as a sensor unit.

The output unit 150 may include at least one of a display unit 151, a sound output module 152, a haptic module 153, or an optical output module 154.

The display unit 151 may display (output) information processed in the AI apparatus 100. For example, the display unit 151 may display execution screen information of an application program running on the AI apparatus 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the AI apparatus 100 and a user, and an output interface between the AI apparatus 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

Figure 5:
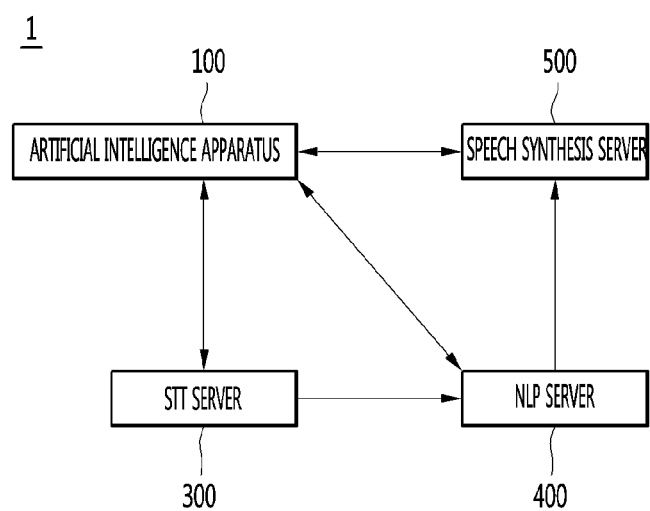
FIG. 5 is a block diagram illustrating an AI system according to an embodiment of the present disclosure.

FIG. 5 is a block diagram illustrating an AI system 1 according to an embodiment of the present disclosure.

Referring to FIG. 5, the AI system 1 may include an AI apparatus 100, a speech-to-text (STT) server 300, a natural language processing (NLP) server 400 and a speech synthesis server 500.

The AI apparatus 100 may transmit speech data to the STT server 300. The STT server 300 may convert the speech data received from the AI apparatus 100 into text data. The NLP server 400 may receive text data from the STT server 300. The NLP server 400 may analyze the intent of the text data based on the received text data. The NLP server 400 may transmit intent analysis information indicating the result of analyzing the intent to the AI apparatus 100 or the speech synthesis server 500. The speech synthesis server 500 may generate a synthesis speech reflecting the intent of the user based on the intent analysis information and transmit the generated synthesis speech to the AI apparatus 100.

The STT server 300 may increase accuracy of speech-to-text conversion using a language model. The language model may mean a model capable of calculating a probability of a sentence or calculating a probability of outputting a next word when previous words are given. For example, the language model may include probabilistic language models such as a unigram model, a bigram model and an N-gram model. The unigram is a model that assumes that all words are completely independent of each other and calculates a probability of a word sequence as a product of probabilities of words. The bigram model is a model that assumes that use of a word depends on only one previous word. The N-gram model is a model that assume that use of a word depends on previous (n−1) words.

That is, the STT server 300 may determine whether the converted text data is appropriately converted from the speech data using a language model, thereby increasing accuracy of conversion from the speech data into the text data.

The NLP server 400 may sequentially perform a morpheme analysis step, a syntax analysis step, a speech-act analysis step, an interaction processing step with respect to text data, thereby generating intent analysis information.

The morpheme analysis step refers to a step of classifying the text data corresponding to the speech uttered by the user into morphemes as a smallest unit having a meaning and determining the part of speech of each of the classified morphemes. The syntax analysis step refers to a step of classifying the text data into a noun phrase, a verb phrase, an adjective phrase, etc. using the result of the morpheme analysis step and determining a relation between the classified phrases. Through the syntax analysis step, the subject, object and modifier of the speech uttered by the user may be determined. The speech-act analysis step refers to a step of analyzing the intent of the speech uttered by the user using the result of the syntax analysis step. Specifically, the speech-act step refers to a step of determining the intent of a sentence such as whether the user asks a question, makes a request, or expresses simple emotion. The interaction processing step refers to a step of determining whether to answer the user's utterance, respond to the user's utterance or question about more information, using the result of the speech-act step.

The NLP server 400 may generate intent analysis information including at least one of the answers to, a response to, or a question about more information on the intent of the user's utterance, after the interaction processing step.

Meanwhile, the NLP server 400 may receive the text data from the AI apparatus 100. For example, when the AI apparatus 100 supports the speech-to-text conversion function, the AI apparatus 100 may convert the speech data into the text data and transmit the converted text data to the NLP server 400.

The speech synthesis server 500 may synthesize prestored speech data to generate a synthesized speech. The speech synthesis server 500 may record the speech of the user selected as a model and divide the recorded speech into syllables or words. The speech synthesis server 500 may store the divided speech in an internal or external database in syllable or word units.

The speech synthesis server 500 may retrieve syllables or words corresponding to the given text data from the database and synthesize the retrieved syllables or words, thereby generating the synthesized speech.

The speech synthesis server 500 may store a plurality of speech language groups respectively corresponding to a plurality of languages. For example, the speech synthesis server 500 may include a first speech language group recorded in Korean and a second speech language group recorded in English.

The speech synthesis server 500 may translate text data of a first language into text of a second language and generate a synthesized speech corresponding to the translated text of the second language using the second speech language group.

The AI system 1 may further include an AI server 200. The AI server 200 may learn at least one of an STT engine used in the STT server 300, an NLP engine used in the NLP server 400 or a speech synthesis engine used in the speech synthesis server 500. That is, at least one of the STT server 300, the NLP server 400 or the speech synthesis server 500 may use models or engines trained in the AI server 200.

Although the AI apparatus 100, the STT server 300, the NLP server 400 and the speech synthesis server 500 are shown as being divided in FIG. 5, the present disclosure is not limited thereto. In one embodiment, some of the AI server 200, the STT server 300, the NLP server 400 or the speech synthesis server 500 may be configured as one server. In one embodiment, some of the STT server 300, the NLP server 400 or the speech synthesis server 500 may be included in the AI apparatus 100. This means that the AI apparatus 100 performs the function of the STT server 300, the NLP server 400 or the speech synthesis server 500.

Figure 6:
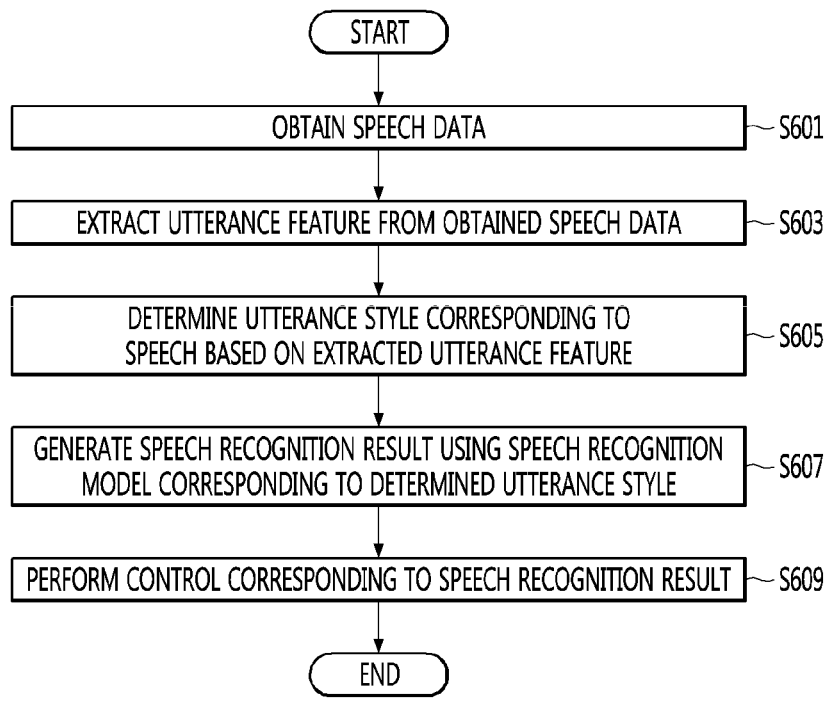
FIG. 6 is a flowchart illustrating a method of recognizing speech in consideration of an utterance style according to an embodiment of the present disclosure.

FIG. 6 is a flowchart illustrating a method of recognizing speech in consideration of an utterance style according to an embodiment of the present disclosure.

Referring to FIG. 6, the processor 180 of the artificial intelligence apparatus 100 obtains speech data including speech of a user (S601).

The processor 180 may obtain the speech data via the microphone 122 or receive the speech data from an external apparatus (not shown) via the communication unit 110.

The speech data may be obtained by converting a sound wave including the speech of the user into a digital signal. For example, the speech data may be an audio file in various formats such as pulse code modulation (PCM), wave or mp3.

The speech of the user may be uttered speech including a command for controlling the artificial intelligence apparatus 100 and a query for searching for information.

The processor 180 may remove noise from the obtained speech data as preprocessing. The processor 180 may directly generate speech data, from which noise is removed, using a noise removal engine or a noise removal filter or transmit the sound data to the artificial intelligence server 200 and receive the speech data, from which noise is removed. In addition, the volume of the speech data may be controlled according to a predetermined level. Control of the volume of the speech data may be regarded as part of the preprocessing. Hereinafter, the speech data may mean the speech data, from which noise is removed via preprocessing.

In addition, the processor 180 of the artificial intelligence apparatus 100 extracts an utterance feature or an utterance feature vector from the obtained speech data (S603).

The utterance feature may also be referred to as an utterance feature set or utterance feature information.

The utterance feature may be differently expressed according to different languages and may be variously expressed according to the user or the speaker, or to the utterance method in the same language. That is, it is obvious that different languages have different utterance features due to the characteristics of languages and, even in the same language, utterance methods differ between persons due to physical characteristics or habits. Therefore, the utterance feature may be differently expressed. In addition, even the same person may intentionally utter speech in different manners like vocal mimicry. Even in this case, the utterance feature may be differently expressed.

The utterance feature may include at least one of a gender of a speaker, a speech speed, a pronunciation, a pronunciation stress, a pause interval, a pitch, a tone, an intonation, a rhyme or an emotion. As described above, if the languages are different, the utterance feature may appear differently. Since this disclosure discloses a method of recognizing speeches having different utterance styles in consideration of the utterance style even though the languages are the same, the language may not be included in the utterance feature. That is, it may be assumed that the language is already considered before the utterance style is considered.

The processor 180 may extract the utterance feature using at least one of the power spectrum of speech or the waveform of speech corresponding to the speech data. The power spectrum may be a parameter indicating which frequency component is included, with which magnitude, in the waveform of a speech signal varying with time. For example, the processor 180 may extract the frequency band of speech from the speech data and extract a main register from the extracted frequency band as the tone of a speaker.

The processor 180 may vectorize the utterance feature to express the utterance feature vector. Hereinafter, the term utterance feature vector may be used interchangeably with the term utterance feature.

In addition, the processor 180 of the artificial intelligence apparatus 100 determines an utterance style corresponding to speech based on the extracted utterance feature (S605).

The processor 180 may determine the utterance style corresponding to the utterance feature vector using a first utterance style determination model.

The first utterance style determination model may refer to a model for clustering utterance feature vectors. The first utterance style determination model may include an artificial neural network and may be learned using a machine learning algorithm or a deep learning algorithm.

The first utterance style determination model may be learned to cluster similar utterance feature vectors into the same cluster in an utterance feature space or a feature space. Here, each clusters may correspond to utterance styles.

The processor 180 may project or map the utterance feature vector extracted from the speech data to the feature space using the first utterance style determination model, calculate a distance between the mapped utterance feature vector and each cluster, and determine a cluster closest to the mapped utterance feature vector as a cluster to which the utterance feature vector belongs. In addition, the processor 180 may determine an utterance style corresponding to the determined cluster as an utterance style corresponding to speech.

The distance between the mapped utterance feature vector and a specific cluster may be calculated using distances from the mapped utterance feature vector to utterance feature vectors belonging to the specific cluster. For example, the first utterance style determination model may calculate mean square errors (MSEs) from the mapped utterance feature vector to the utterance feature vectors belonging to the specific cluster in a feature space, and determine a cluster having a smallest MSE as a cluster corresponding the input utterance feature vector.

For example, it is assumed that the utterance feature space of the first utterance style determination model is divided into first to fourth clusters in advance through learning. If the mapped utterance feature vector is closest to the first cluster in the utterance feature space, the first utterance style determination model may determine the utterance style corresponding to speech as the utterance style corresponding to the first cluster.

In one embodiment, the processor 180 may divide the speech data in predetermined units, and determine the utterance style in the predetermined units. The predetermined units may include a word, a phrase, a clause, a sentence, a paragraph, etc. For example, the processor 180 may divide the speech included in the speech data in sentence units and determine the utterance style for each divided sentence.

In addition, the processor 180 of the artificial intelligence apparatus 100 generates a speech recognition result using a speech recognition model corresponding to the determined utterance style (S607).

The speech recognition result for the speech data may include text converted from the speech included in the speech data or meaning information or intent information corresponding to the converted text. Generating the speech recognition result may mean generating intent information corresponding to the speech data.

In one embodiment, the processor 180 may generate the speech recognition results corresponding to the speech data using the speech recognition model corresponding to the determined utterance style among the speech recognition models stored in the memory 170.

In one embodiment, the processor 180 may transmit the obtained speech data and the determined utterance style information to the artificial intelligence server 200 via the communication unit 110, the processor 260 of the artificial intelligence server 200 may generate intent information corresponding to the received speech data to recognize speech using the speech recognition model corresponding to the received utterance style information among the speech recognition models corresponding to the utterance styles stored in the memory 230, and the artificial intelligence apparatus 100 may receive the generated intent information from the artificial intelligence server 200 via the communication unit 110.

Each speech recognition model may be learned using speech data corresponding to each utterance style and a speech recognition result corresponding thereto. For example, a first speech recognition model corresponding to a first utterance style may be learned using first speech data corresponding to a first style and a first speech recognition result corresponding thereto and a second speech recognition model corresponding to a second utterance style may be learned using second speech data corresponding to a second style and a second speech recognition result corresponding thereto.

Each speech recognition model may include a speech-to-text (STT) engine for converting speech data into text and a natural language processing (NLP) engine for analyzing and extracting meaningful information from text. The STT engine may include an acoustic model (AM) and a language model (LM).

For example, the processor 180 may convert the speech data into text using the STT engine included in the speech recognition model corresponding to the utterance style, generate intent information corresponding to the converted text using the NLP engine included in the speech recognition model corresponding to the utterance style, and generate a speech recognition result corresponding to the generated intent information. When the speech data is converted into text, the processor 180 may calculate a word-by-word probability corresponding to each section of the speech data, convert the speech data into text based on the calculated probability, and generate the speech recognition result based on the converted text. In particular, the processor 180 may combine words having a highest probability and convert the speech data into text.

Since the utterance style mainly affects performance when the speech data is converted into text, the speech recognition models corresponding to the utterance styles may mean speech recognition models including an STT engine corresponding to each utterance style. That is, in one embodiment, each speech recognition model may include the same NLP engine and an STT engine corresponding to each utterance style.

In one embodiment, the processor 180 may generate the speech recognition results corresponding to the speech data using the speech recognition model corresponding to the utterance style determined in predetermined units. For example, the processor 180 may generate intent information corresponding to each divided sentence using the speech recognition model corresponding to the utterance style determined for each divided sentence, thereby generating the intent information or the speech recognition result corresponding to the speech data.

In addition, the processor 180 of the artificial intelligence apparatus 100 performs control corresponding to the generated speech recognition result (S609).

If the speech recognition result is a control command for controlling the artificial intelligence apparatus 100 or the external apparatus (not shown), the processor 180 may perform control corresponding to the control command. In particular, if the control command is a command for controlling the external apparatus (not shown), the processor 180 may generate a control signal for controlling the external apparatus (not shown) according to the control command and transmit the control signal to the external apparatus (not shown) via the communication unit 110. In addition, the processor 180 may output feedback on the control command to the user via the output unit 150 or transmit an output signal for outputting feedback on the control command to a user terminal (not shown) via the communication unit 110.

Similarly, if the speech recognition result is a query for requesting information, the processor 180 may generate response information corresponding to the query via the Internet. In addition, the processor 180 may output the generated response information via the output unit 150 or transmit an output signal for outputting the response information to the user terminal (not shown) via the communication unit 110.

The processor 180 may generate response speech for outputting the response information and audibly output the response speech via the sound output unit 152. Specifically, the processor 180 may generate a response sentence using a natural language generation (NLG) scheme, convert the generated response sentence into the response speech using a text-to-speech (TTS) engine, and output the converted response speech via the sound output unit 152.

In one embodiment, the first utterance style determination model may refer to a model for extracting an utterance feature vector from speech data when the speech data is input and mapping the extracted utterance feature vector to a feature space to determine an utterance style. In this case, the processor 180 may perform step S603 of extracting the utterance feature from the speech data and step S605 of determining the utterance style corresponding to speech based on the extracted utterance feature by using the first utterance style determination model.

The steps shown in FIG. 6 may be repeatedly performed and thus, the artificial intelligence apparatus 100 may repeatedly recognize the speech of the user.

Figure 7:
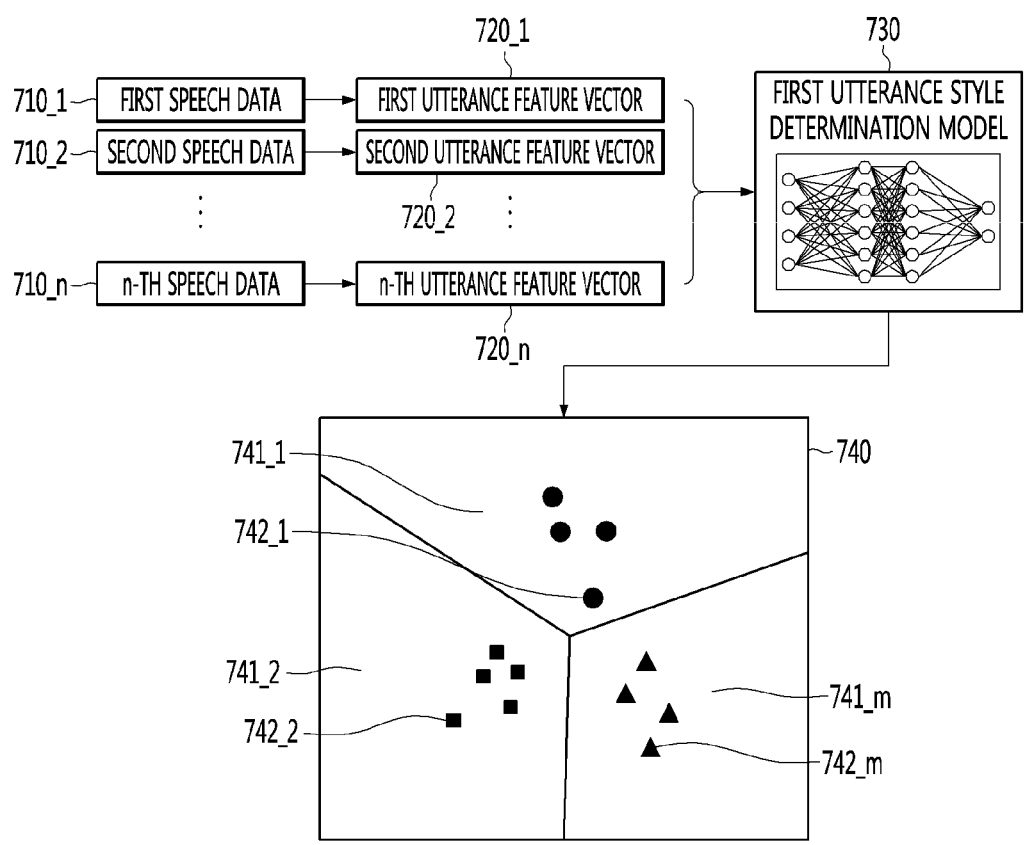
FIG. 7 is a view illustrating a first utterance style determination model according to an embodiment of the present disclosure.

FIG. 7 is a view illustrating a first utterance style determination model according to an embodiment of the present disclosure.

Referring to FIG. 7, utterance feature vectors 720_1, 720_2 to 720_n are extracted from speech data 710_1, 710_2 to 710_n. When the extracted utterance feature vectors 720_1, 720_2 to 720_n are input, the first utterance style determination model 730 may map the input utterance feature vectors 720_1, 720_2 to 720_n to a feature space 740, cluster the mapped utterance feature vectors and determine the mapped utterance feature vectors as one of a plurality of clusters 741_1, 741_2 to 741_m corresponding to a plurality of utterance styles. That is, the first utterance style determination model 730 shown in FIG. 7 may mean a model for determining the input utterance feature vectors as one of the plurality of styles when the utterance feature vectors extracted from the speech data in advance are input.

In FIG. 7, the mapped utterance feature vectors 742_1 belonging to a first cluster 741_1 corresponding to a first speech style are represented by a circle, the mapped utterance feature vectors 742_2 belonging to a second cluster 741_2 corresponding to a second speech style is represented by a rectangle, and the mapped utterance feature vectors 742_m belonging to an m-th cluster 742_m corresponding to an m-th speech style is represented by a triangle. In addition, the feature space 740 is divided into first to m-th clusters 741_1, 741_2 to 741_m, and there is no area which does not belong to the first to m-th clusters 741_1, 741_2 to 741_m.

Although the feature space 740 is two-dimensionally illustrated in the example of FIG. 7, this is merely a simplified presentation for visualizing the feature space 740 and a plurality of axes may be included in the feature space 740. In addition, although only three clusters are illustrated as being included in the feature space 740 in the example of FIG. 7, this is merely an example and a plurality of clusters may be included in the feature space 740.

Figure 8:
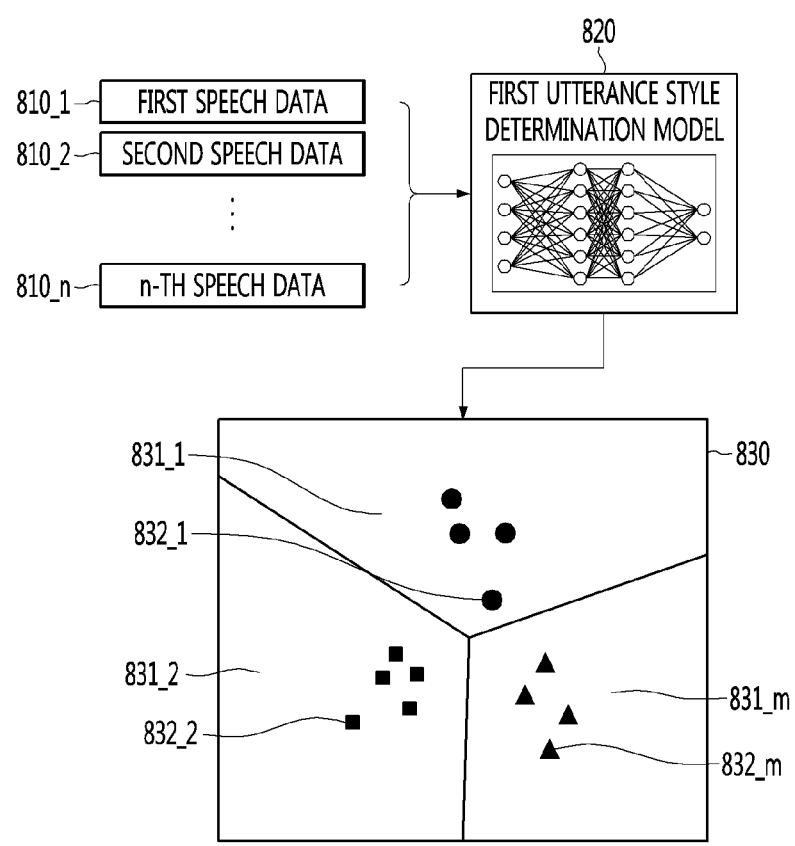
FIG. 8 is a view illustrating a first utterance style determination model according to an embodiment of the present disclosure.

FIG. 8 is a view illustrating a first utterance style determination model according to an embodiment of the present disclosure.

Referring to FIG. 8, when speech data 810_1, 810_2 to 810_n is input, a first utterance style determination model 820 extracts utterance feature vectors from the input speech data 810_1, 810_2 to 810_n, maps the extracted utterance feature vectors to a feature space 830, clusters the mapped utterance feature vectors and determines the mapped utterance feature vectors as one of a plurality of clusters 831_1, 831_2 to 831_m corresponding to a plurality of utterance styles. That is, when the speech data is input, the first utterance style determination model 820 shown in FIG. 8 may mean a model for extracting an utterance feature vector from the input speech data and determining the extracted utterance feature vector as one of a plurality of styles.

In the example of FIG. 8, the mapped utterance feature vectors 832_1 belonging to a first cluster 831_1 corresponding to a first speech style are represented by a circle, the mapped utterance feature vectors 832_2 belonging to a second cluster 831_2 corresponding to a second speech style are represented by a rectangle, and the mapped utterance feature vectors 832_m belonging to an m-th cluster 832_m corresponding to an m-th speech style are represented by a triangle.

Although the feature space 830 is two-dimensionally illustrated in the example of FIG. 8, this is merely a simplified presentation for visualizing the feature space 830 and a plurality of axes may be included in the feature space 830. In addition, although only three clusters are illustrated as being included in the feature space 830 in the example of FIG. 8, this is merely an example and a plurality of clusters may be included in the feature space 830.

Figure 9:
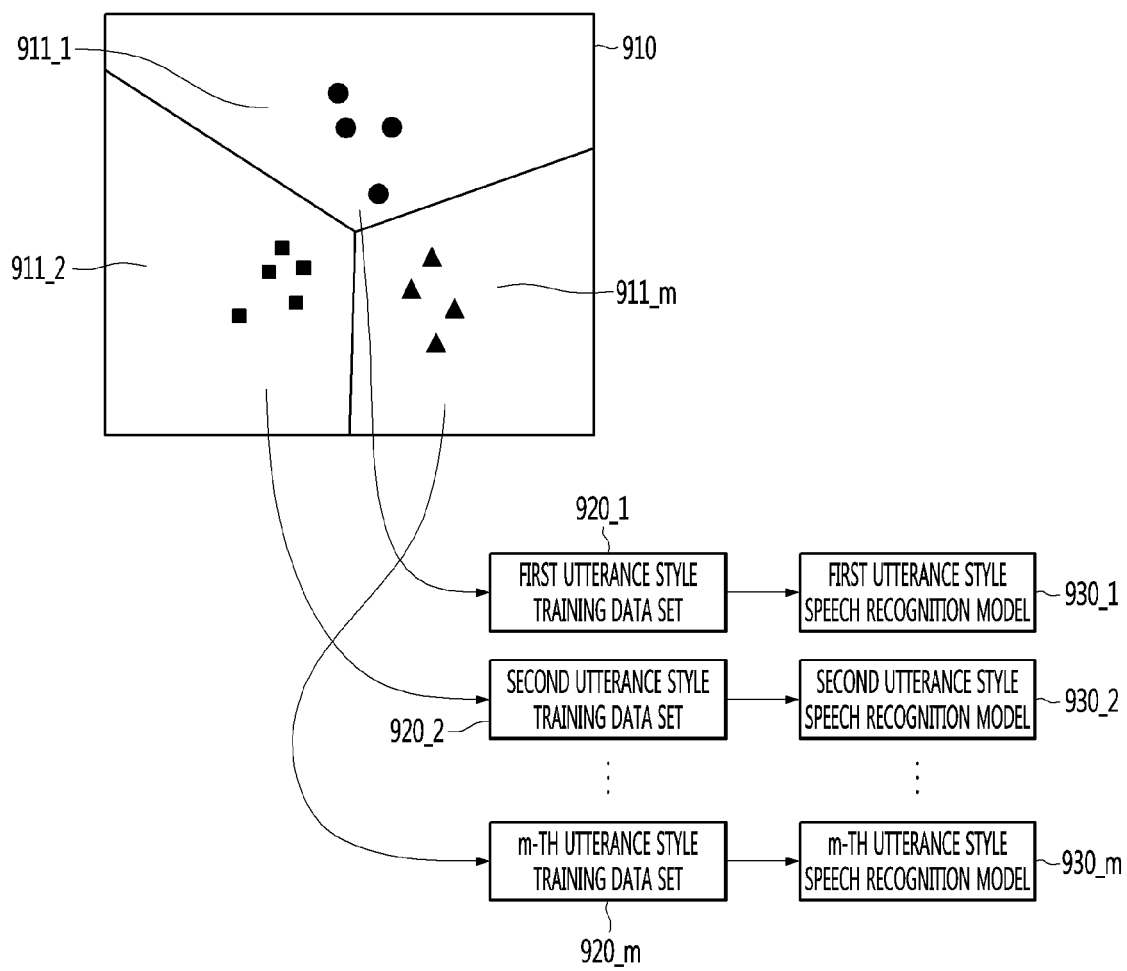
FIG. 9 is a view illustrating a method of learning a plurality of speech recognition models according to an embodiment of the present disclosure.

FIG. 9 is a view illustrating a method of learning a plurality of speech recognition models according to an embodiment of the present disclosure.

Referring to FIG. 9, each speech data may be determined as one of a plurality of clusters 911_1, 911_2 to 911_m in a feature space 910 using the first utterance style determination model, and each cluster may correspond to one utterance style. That is, the first cluster 911_1 corresponds to a first utterance style, the second cluster 911_2 corresponds to a second utterance style, and the m-th cluster 911_m corresponds to an m-th utterance style.

The processor 180 or the learning processor 130 may determine utterance style of each training data to be used to learn the speech recognition model using the first utterance style determination model. The training data may include speech data for training a speech recognition model and a speech recognition result corresponding to the speech data, and the speech recognition result is label data and may mean a result or a correct answer inferred from the speech data by the speech recognition model.

If the speech recognition models divided by the utterance styles are regarded as STT engines divided by utterance styles, the training data may include speech data for training of the STT engine and text corresponding to the speech data, and text is label data and may mean a result or correct answer inferred from the speech data by the STT engine.

In addition, the processor 180 or the learning processor 130 may configure, as a first utterance style training data set 920_1, training data belonging to the first cluster 911_1 among the training data and determined as the first utterance style, configure, as a second utterance style training data set 920_2, training data belonging to the second cluster 911_2 among the training data and determined as the second utterance style, and configure, as an m-th utterance style training data set 920_m, training data belonging to the m-th cluster 911_m among the training data and determined as the m-th utterance style.

In addition, the processor 180 or the learning processor 130 may learn a first speech recognition model or a first utterance style speech recognition model 930_1 using the training data belonging to the first utterance style training data set 920_1, learn a second speech recognition model or a second utterance style speech recognition model 930_2 using the training data belonging to the second utterance style training data set 920_2, and learn an m-th speech recognition model or an m-th utterance style speech recognition model 930_m using the training data belonging to the m-th utterance style training data set 920_m.

Thereafter, when the speech data for speech recognition is obtained, the processor 180 may determine an utterance style corresponding to the obtained speech data using the first utterance style determination model and generate a speech recognition result using the speech recognition model corresponding to the determined utterance style.

The method of learning the speech recognition model may be performed not only in the artificial intelligence apparatus 100 but also in the artificial intelligence server 200. That is, the processor 260 of the artificial intelligence server 200 or the learning processor 240 may divide the training data by the utterance styles to configure training data sets 920_1, 920_2 to 920_m corresponding to the utterance styles, and learn speech recognition models 930_1, 930_2 to 930_m corresponding to the utterance styles using the training data sets 920_1, 920_2 to 920_m. In this case, the artificial intelligence apparatus 100 may receive the learned speech recognition models 930_1, 930_2 to 930_m from the artificial intelligence server 200 via the communication unit 110 of the artificial intelligence apparatus 100.

Even if the training data is divided by the utterance styles to learn the speech recognition model, training may not be performed for all utterance styles. Accordingly, when speech data having an utterance style completely different from previously learned utterance styles is obtained, if the utterance style of the obtained speech data is determined as one of the previously learned utterance styles and speech is recognized using a speech recognition model corresponding to the determined utterance style, it is impossible to ensure high accuracy. Accordingly, there is a need for a method of accurately recognizing speech data having an utterance style different from the previously learned utterance styles.

Figure 10:
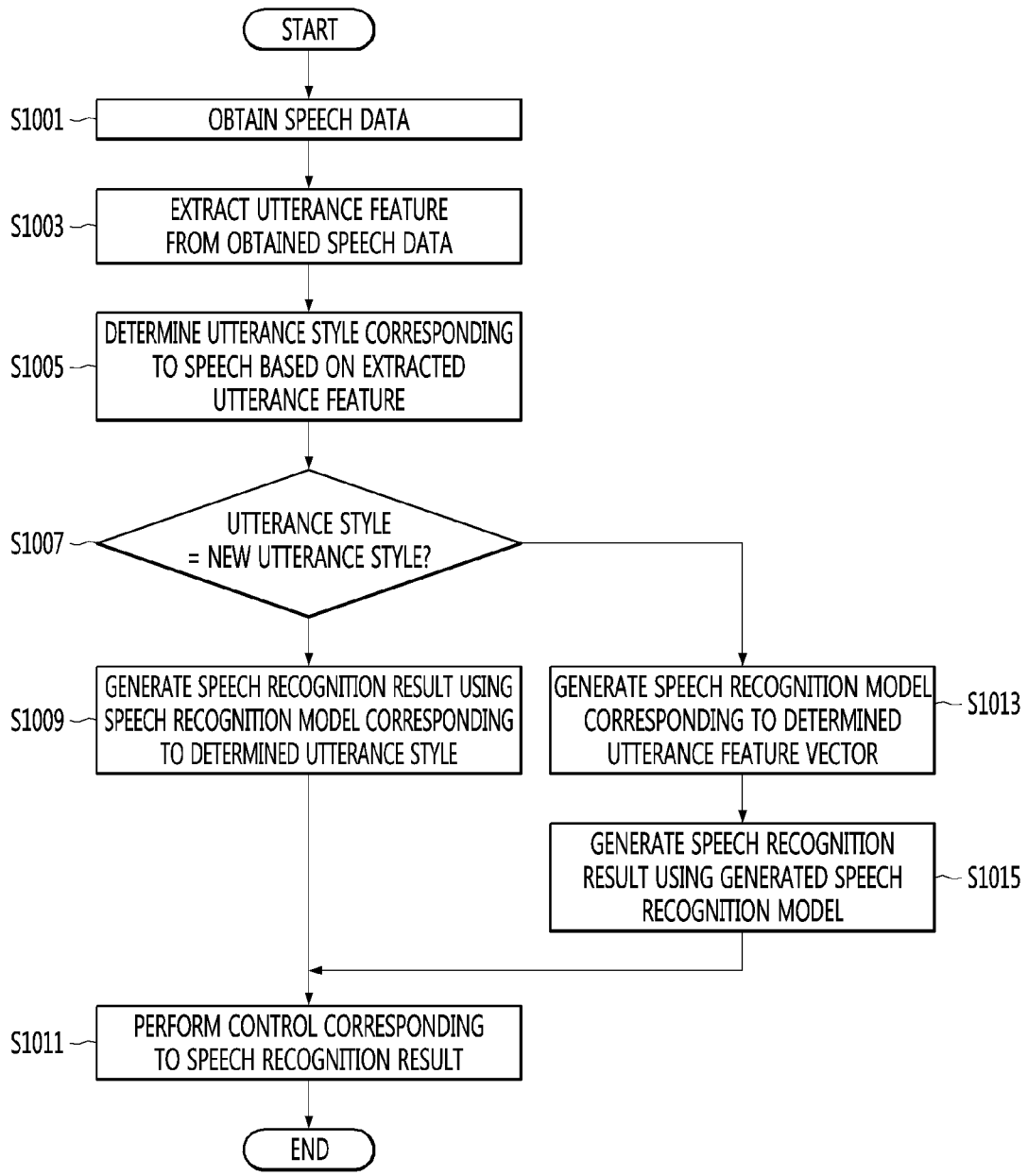
FIG. 10 is a flowchart illustrating a method of recognizing speech in consideration of an utterance style according to an embodiment of the present disclosure.

FIG. 10 is a flowchart illustrating a method of recognizing speech in consideration of an utterance style according to an embodiment of the present disclosure.

Referring to FIG. 10, the processor 180 of the artificial intelligence apparatus 100 obtains speech data corresponding to speech of the user (S1001). This step corresponds to step S601 of obtaining the speech data of FIG. 6.

In addition, the processor 180 of the artificial intelligence apparatus 100 extracts an utterance feature or an utterance feature vector from the obtained speech data (S1003). This step corresponds to step S603 of extracting the utterance feature or the utterance feature vector of FIG. 6.

In addition, the processor 180 of the artificial intelligence apparatus 100 determines an utterance style corresponding to speech based on the extracted utterance feature (S1005). This step corresponds to step S605 of determining the utterance style of FIG. 6.

However, this is different from FIG. 6 in that, when the processor 180 determines the utterance style corresponding to speech based on the extracted utterance feature, determination of the utterance style may fail.

In step S605 of determining the utterance style illustrated in FIG. 6, the processor 180 may determine the utterance style of the obtained speech data as one of the previously learned utterance styles using the first utterance style determination model. In contrast, in step S1005 of determining the utterance style illustrated in FIG. 10, the processor 180 may determine the utterance style of the obtained speech data as one of the previously learned utterance styles or as a new utterance style which is not previously learned, using the second utterance style determination model.

The second utterance style determination model may be a model for clustering utterance feature vectors. The second utterance style determination model may include an artificial neural network and may be learned using a machine learning algorithm or a deep learning algorithm.

The second utterance style determination model may be a model learned to cluster similar utterance feature vectors into the same cluster in an utterance feature space or a feature space. Here, each clusters may correspond to utterance styles.

The second utterance style determination model may determine whether the input utterance feature vector is similar to an utterance feature vector belonging to the previously learned clusters, unlike the first utterance style determination model. If the input utterance feature vector is similar to the utterance feature vector belonging to the previously learned clusters, the second utterance style determination model may determine the input utterance feature vector as a cluster corresponding to the similar utterance feature vector, thereby determining the utterance style. However, if the input utterance feature vector is not similar (close) to the utterance feature vector belonging to the previously learned clusters, a new utterance style may be generated and determined with respect to the input utterance feature vector.

The processor 180 may project or map the utterance feature vector extracted from the speech data to the feature space using the second utterance style determination model, calculate a distance between the mapped utterance feature vector and each cluster, and determine that the utterance feature vector belongs to a cluster if a distance between the mapped utterance feature vector and a closest cluster is less than a predetermined reference value. In addition, the processor 180 may determine an utterance style corresponding to the determined cluster as an utterance style corresponding to speech. If the distance between the mapped utterance feature vector and the closest cluster is equal to or greater than the predetermined reference value, the second utterance style determination model may generate a new utterance style and determine the utterance style corresponding to the input utterance feature vector (or the speech data) as a new utterance style.

The distance between the mapped utterance feature vector and a specific cluster may be calculated using a distance from the mapped utterance feature vector to the utterance feature vectors belonging to the specific cluster. For example, the second utterance style determination model may calculate a mean square error (MSE) from the mapped utterance feature vector to the utterance feature vectors belonging to the specific cluster in the feature space, and determine a cluster having a smallest MSE and less than a predetermined reference value as the cluster corresponding to the input utterance feature vector.

For example, it is assumed that the utterance feature space of the second utterance style determination model is divided into first to fourth clusters in advance through learning. If the mapped utterance feature vector is closest to the first cluster in the utterance feature space and the distance between the mapped utterance feature vector and the first cluster is less than the predetermined reference value, the second utterance style determination model may determine the utterance style corresponding to speech as the utterance style corresponding to the first cluster. If the mapped utterance feature vector is closest to the first cluster in the utterance feature space but the distance between the mapped utterance feature vector and the first cluster is equal to or greater than the predetermined reference value, the second utterance style determination model may generate a new cluster and determine the utterance style corresponding to speech as an utterance style corresponding to the new cluster.

In one embodiment, the processor 180 may divide the speech data in predetermined units, and determine the utterance style in the predetermined units. The predetermined units may include a word, a phrase, a clause, a sentence, a paragraph, etc. For example, the processor 180 may divide the speech included in the speech data in sentence units and determine the utterance style for each divided sentence.

In addition, the processor 180 of the artificial intelligence apparatus 100 determines whether the utterance style is a new utterance style (S1007).

If the determined utterance style is not a new utterance style as the result of determination of step S1007, the processor 180 of the artificial intelligence apparatus 100 generates a speech recognition result using a speech recognition model corresponding to the determined utterance style (S1009). This step corresponds to step S607 of generating the speech recognition result of FIG. 6.

In addition, the processor 180 of the artificial intelligence apparatus 100 performs control corresponding to the speech recognition result (S1011). This step corresponds to step S609 of performing control of FIG. 6.

If the determined utterance style is a new utterance style as the result of determination of step S1007, the processor 180 of the artificial intelligence apparatus 100 or the learning processor 130 generates a speech recognition model corresponding to the extracted utterance feature vector (S1013).

According to the utterance style determination model, there is no previously learned utterance style corresponding to the extracted utterance feature vector. Accordingly, since all the previously learned speech recognition models correspond to the utterance styles different from the extracted utterance feature vectors, it is difficult to obtain high speech recognition performance with respect to the extracted utterance feature vector. Accordingly, there is a need for a speech recognition model corresponding to the extracted utterance feature vector. That is, there is a need for a speech recognition model corresponding to the new utterance style.

The processor 180 or the learning processor 130 may generate a new utterance style, determine the utterance feature vector extracted from the speech data as a new utterance style, and generate training data of the new utterance style having the utterance feature vector corresponding to the new utterance style using a text-to-speech (TTS) engine. The generated training data may include speech data corresponding to the new utterance style and text corresponding to the speech data. The TTS engine used herein may synthesize (convert) speech data having a desired utterance feature from text.

The processor 180 or the learning processor 130 may generate not only speech data having the same utterance feature as the same utterance feature vector as the extracted utterance feature vector but also speech data having an utterance feature changed from the extracted utterance feature vector by less than a predetermined reference value, when training data of the new utterance style is generated.

The memory 170 may store a predetermined text set to be used when generating the training data. The processor 180 or the learning processor 130 may synthesize speech data corresponding to the predetermined text set stored in the memory 170 using the TTS engine and generate training data including the synthesized speech data and text corresponding thereto.

The processor 180 or the learning processor 130 may generate a speech recognition model corresponding to the new utterance style using the training data generated with respect to the new utterance style. Generating the speech recognition model may mean learning a new speech recognition model using the generated training data.

As described above, the speech recognition model may include an STT engine for converting speech data into text and a natural language processing (NLP) engine for analyzing and extracting meaningful information from text. The STT engine may include an acoustic model (AM) and a language model (LM). In addition, the speech recognition model corresponding to the new utterance style may mean a speech recognition model including an STT engine corresponding to a new utterance style. That is, the processor 180 or the learning processor 130 may generate an STT engine corresponding to the new utterance style, thereby generating a speech recognition model corresponding to the new utterance style.

In one embodiment, the processor 180 of the artificial intelligence apparatus 100 may transmit the extracted utterance feature vector to the artificial intelligence server 200 via the communication unit 110, and the processor 260 of the artificial intelligence server 200 or the learning processor 240 may learn a speech recognition model corresponding to the received utterance feature vector, store the learned speech recognition model in the memory 230, and transmit the learned speech recognition model to the artificial intelligence apparatus 100 via the communication unit 210. The artificial intelligence server 200 may learn the speech recognition model corresponding to the utterance feature vector, using the same method as the method of learning the speech recognition model corresponding to the utterance feature vector in the processor 180 of the artificial intelligence apparatus 100 or the learning processor 130.

In addition, the processor 180 of the artificial intelligence apparatus 100 generates a speech recognition result using the generated speech recognition model (S1015).

In one embodiment, the processor 180 may generate a speech recognition result corresponding to the speech data using the speech recognition model generated in step S1013 and stored in the memory 170

In one embodiment, if the artificial intelligence server 200 generates and stores the speech recognition model corresponding to the extracted utterance feature vector, the processor 180 of the artificial intelligence apparatus 100 may transmit the obtained speech data and the extracted utterance feature vector to the artificial intelligence server 200 via the communication unit 110, the processor 260 of the artificial intelligence server 200 may generate intent information corresponding to the received speech data using the speech recognition model generated in correspondence with the received utterance feature vector stored in the memory 230 to recognize speech, and the artificial intelligence apparatus 100 may receive the generated intent information from the artificial intelligence server 200 via the communication unit 110. If the extracted utterance feature vector is generated as a new utterance style, the processor 180 may transmit the obtained speech data and the new utterance style to the artificial intelligence server 200 via the communication unit 110, and receive the intent information corresponding to the speech data from the artificial intelligence server 200.

In one embodiment, the processor 180 may generate a speech recognition results corresponding to the speech data using the speech recognition model corresponding to the utterance style determined in predetermined units. For example, the processor 180 may generate intent information corresponding to each divided sentence using the speech recognition model corresponding to the utterance style determined for each divided sentence, thereby generating intent information or a speech recognition result corresponding to the speech data.

In addition, the processor 180 of the artificial intelligence apparatus 100 performs control corresponding to the speech recognition result (S1011). This step corresponds to step S609 of performing control of FIG. 6.

Steps shown in FIG. 10 may be repeatedly performed and thus, the artificial intelligence apparatus 100 may repeatedly recognize the speech of the user.

Figure 11:
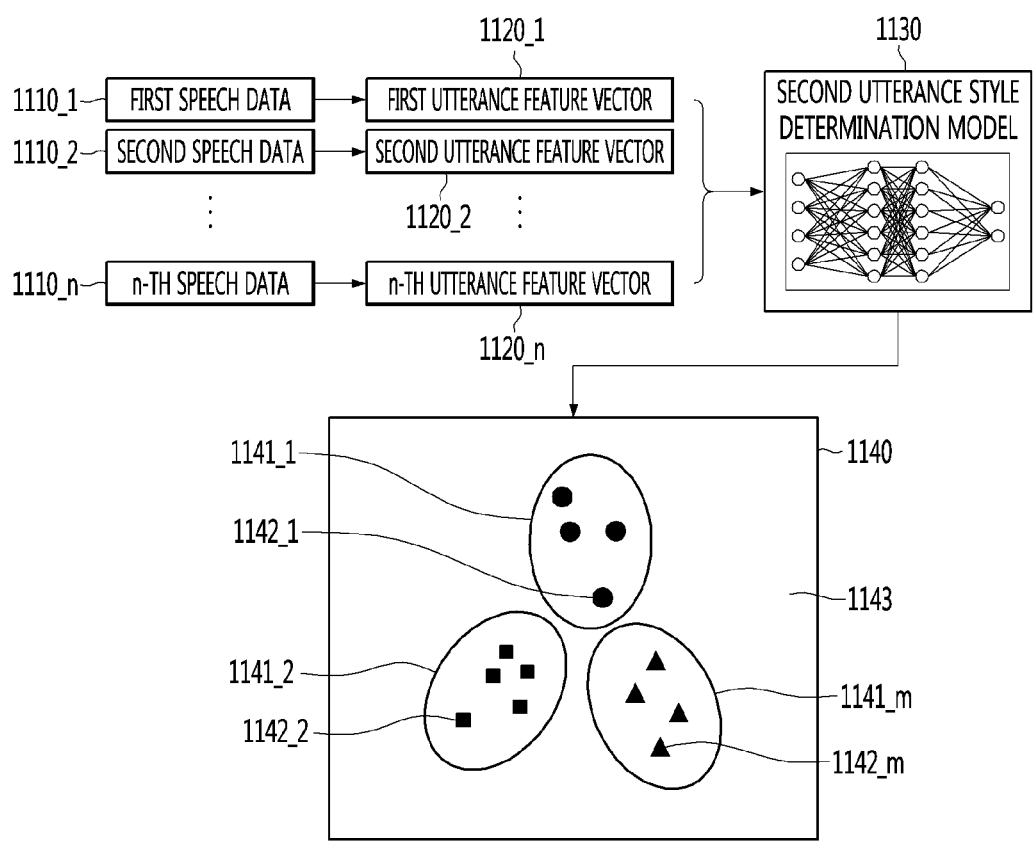
FIG. 11 is a view illustrating a second utterance style determination model according to an embodiment of the present disclosure.

FIG. 11 is a view illustrating a second utterance style determination model according to an embodiment of the present disclosure.

Referring to FIG. 11, the utterance feature vectors 1120_1, 1120_2 to 1120_$n$ are extracted from the speech data 1110_1, 1110_2 to 1110_$n$. When the extracted utterance feature vectors 1120_1, 1120_2 to 1120_$n$ are input, the second utterance style determination model 1130 may map the input utterance feature vectors 1120_1, 1120_2 to 1120_$n$ to a feature space 1140, cluster the mapped utterance feature vectors, and determine mapped utterance feature vectors as one of a plurality of clusters 1141_1, 1141_2 to 1141_$m$ corresponding to a plurality of utterance styles or as a new cluster (not shown) corresponding to a new utterance style. That is, the second utterance style determination model 1130 illustrated in FIG. 11 may mean a model for determining the input utterance feature vectors as one of a plurality of predetermined styles or a new utterance style when the utterance feature vectors extracted from the speech data are input.

In FIG. 11, the mapped utterance feature vectors 1142_1 belonging to the first cluster 1141_1 corresponding to a first speech style is represented by a circle, the mapped utterance feature vectors 1142_2 belonging to the second cluster 1141_2 corresponding to the second speech style are represented by a rectangle, and the mapped utterance feature vectors 1142_$m$ belonging to the m-th cluster 1142_$m$ corresponding to the m-th speech style is represented by a triangle. In addition, the feature space 1140 is divided into an area corresponding to first to m-th clusters 1141_1, 1141_2 to 1141_m and an area 1143 which does not belong to any one of first to m-th clusters 1141_1, 1141_2 to 1141_m.

Although the feature space 1140 is two-dimensionally illustrated in the example of FIG. 11, this is merely a simplified presentation for visualizing the feature space 1140 and a plurality of axes may be included in the feature space 1140. In addition, although only three clusters are illustrated as being included in the feature space 1140 in the example of FIG. 11, this is merely an example and a plurality of clusters may be included in the feature space 1140.

Figure 12:
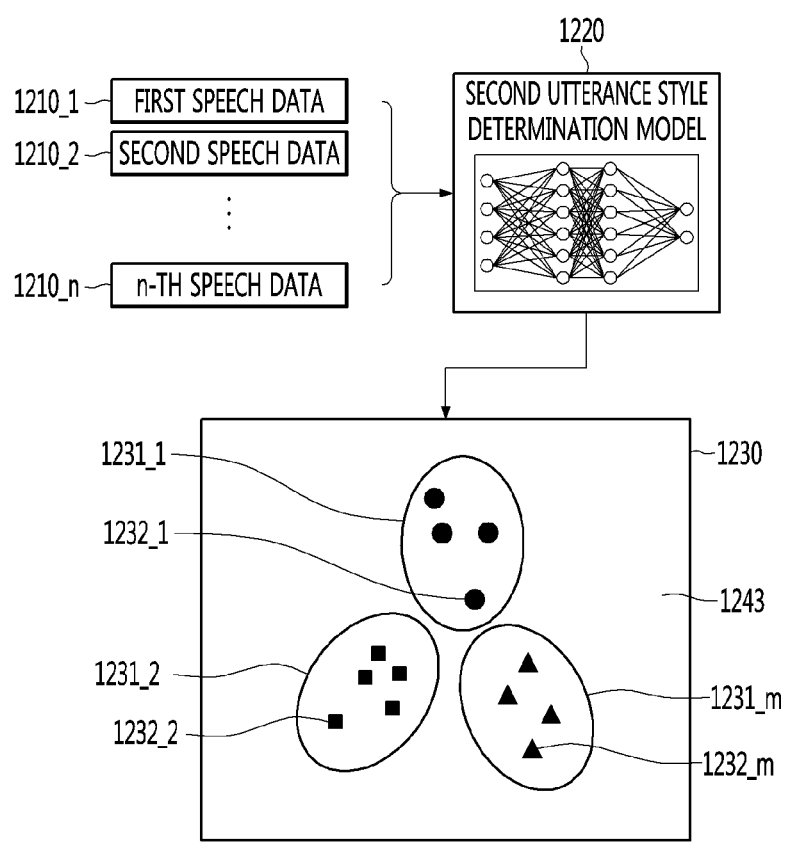
FIG. 12 is a view illustrating a second utterance style determination model according to an embodiment of the present disclosure.

FIG. 12 is a view illustrating a second utterance style determination model according to an embodiment of the present disclosure.

Referring to FIG. 12, when speech data 1210_1, 1210_2 to 1210_n are input, the second utterance style determination model 1220 may extract the utterance feature vectors from the input speech data 1210_1, 1210_2 to 1210_n, map the extracted utterance feature vectors to a feature space 1230, cluster the mapped utterance feature vectors and determine the mapped utterance feature vectors as one of a plurality of clusters 1231_1, 1231_2 to 1231_m corresponding to a plurality of utterance styles. That is, the second utterance style determination model 1220 illustrated in FIG. 12 may mean a model for extracting an utterance feature vector from input speech data when speech data is input and determine the extracted utterance feature vector as one of a plurality of predetermined styles or a new utterance style.

In the example of FIG. 12, the mapped utterance feature vectors 1232_1 belonging to the first cluster 1231_1 corresponding to the first speech style are represented by a circle, the mapped utterance feature vectors 1232_2 belonging to the second cluster 1231_2 corresponding to the second speech style are represented by a rectangle, and the mapped utterance feature vectors 1232_m belonging to an m-th cluster 1232_m corresponding to an m-th speech style are represented by a triangle. In addition, the feature space 1230 is divided into an area corresponding to first to m-th clusters 1231_1, 1231_2 to 1231_m and an area 1233 which does not belong to any one of the first to m-th clusters 1231_1, 1231_2 to 1231_m.

Although the feature space 1230 is two-dimensionally illustrated in the example of FIG. 12, this is merely a simplified presentation for visualizing the feature space 1230 and a plurality of axes may be included in the feature space 1230. In addition, although only three clusters are illustrated as being included in the feature space 1230 in the example of FIG. 12, this is merely an example and a plurality of clusters may be included in the feature space 1230.

Figure 13:
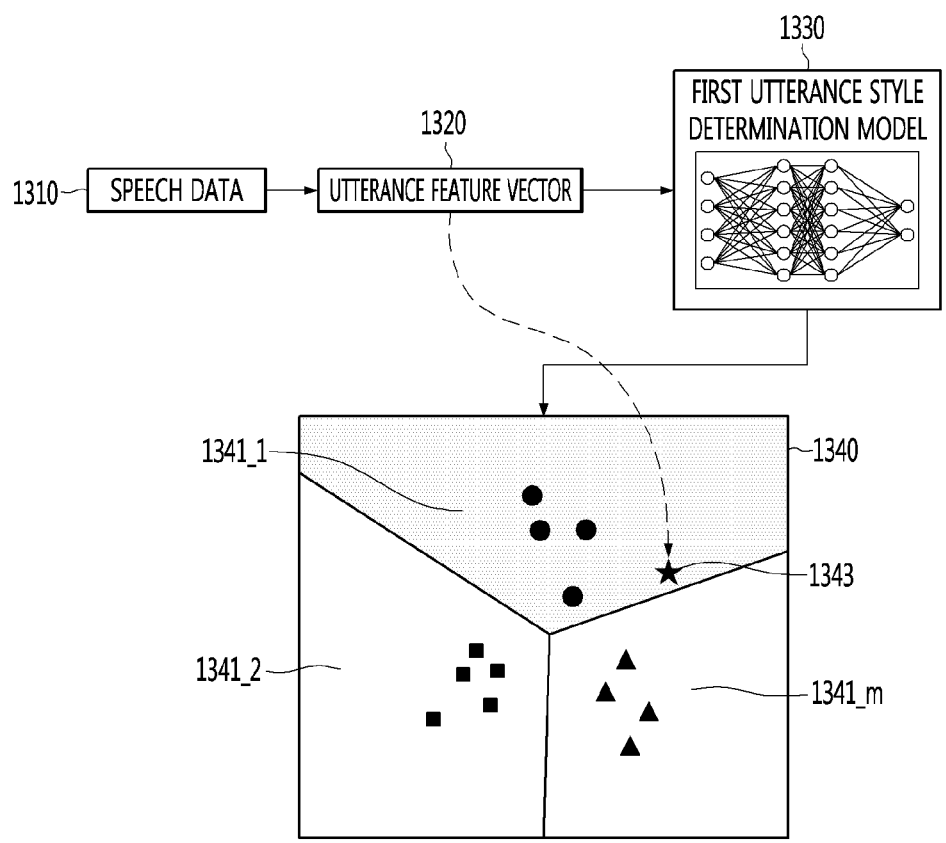
FIG. 13 is a view illustrating a method of determining an utterance style using a first utterance style determination model according to an embodiment of the present disclosure.

FIG. 13 is a view illustrating a method of determining an utterance style using a first utterance style determination model according to an embodiment of the present disclosure.

Referring to FIG. 13, the processor 180 may extract an utterance feature vector 1320 from speech data 1310, and determine the utterance style of the extracted utterance feature vector 1320 using a first utterance style determination model 1330. The first utterance style determination model 1330 may map the utterance feature vector 1320 to a feature space 1340. The feature space 1340 may be divided into an area respectively corresponding to first to m-th clusters 1341_1, 1341_2 to 1341_m.

In the example of FIG. 13, a mapped utterance feature vector 1343 is not adjacent to the utterance feature vectors belonging to the existing first to m-th clusters 1341_1, 1341_2 to 1341_m. However, as the mapping result of the first utterance style determination model 1330, the mapped utterance feature vector 1343 is included in the area of the first cluster 1341_1. Accordingly, the first utterance style determination model 1330 may determine the utterance style of the speech data 1310 as a first utterance style corresponding to the first cluster 1341_1.

Figure 14:
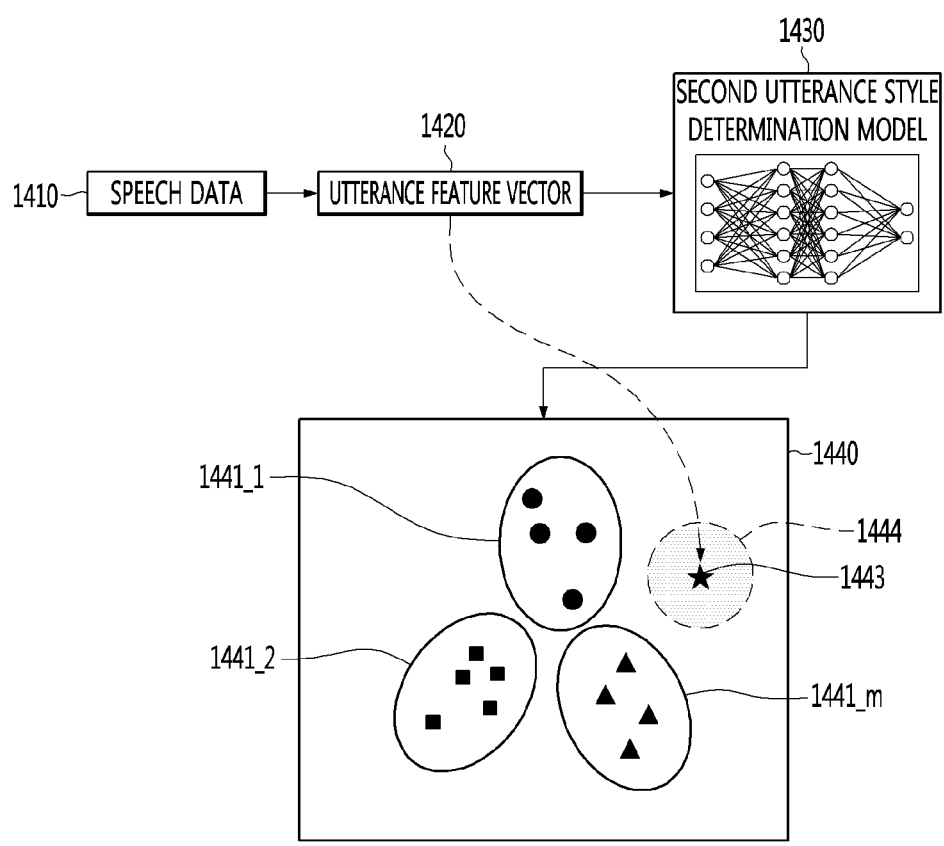
FIG. 14 is a view illustrating a method of determining an utterance style using a second utterance style determination model according to an embodiment of the present disclosure.

FIG. 14 is a view illustrating a method of determining an utterance style using a second utterance style determination model according to an embodiment of the present disclosure.

Referring to FIG. 14, the processor 180 may extract an utterance feature vector 1420 from speech data 1410, and determine the utterance style of the extracted utterance feature vector 1420 using a second utterance style determination model 1430. The second utterance style determination model 1430 may map the utterance feature vector 1420 to a feature space 1440. The feature space 1440 may be divided into areas respectively corresponding to first to m-th clusters 1441_1, 1441_2 to 1441_m or the other area.

In the example of FIG. 14, a mapped utterance feature vector 1443 is not adjacent to the utterance feature vectors belonging to the existing first to m-th clusters 1441_1, 1441_2 to 1441_m. As the mapping result of the second utterance style determination model 1430, the mapped utterance feature vector 1443 is not included in any one of areas respectively corresponding to the first to m-th clusters 1441_1, 1441_2 to 1441_m. Accordingly, the second utterance style determination model 1430 may generate a new cluster 1444 corresponding to the mapped utterance feature vector 1443, and determine the utterance style of the speech data 1410 as the new utterance style corresponding to the new cluster 1444.

Figure 15:
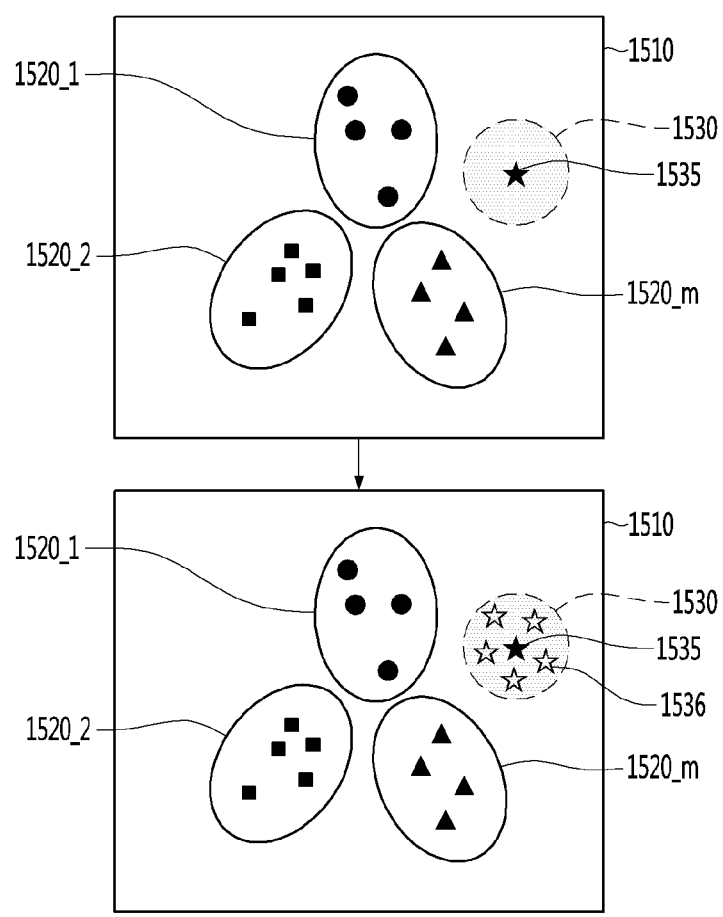
FIGS. 15 and 16 are views illustrating a method of learning a speech recognition model corresponding to a new utterance style according to an embodiment of the present disclosure.
Figure 16:
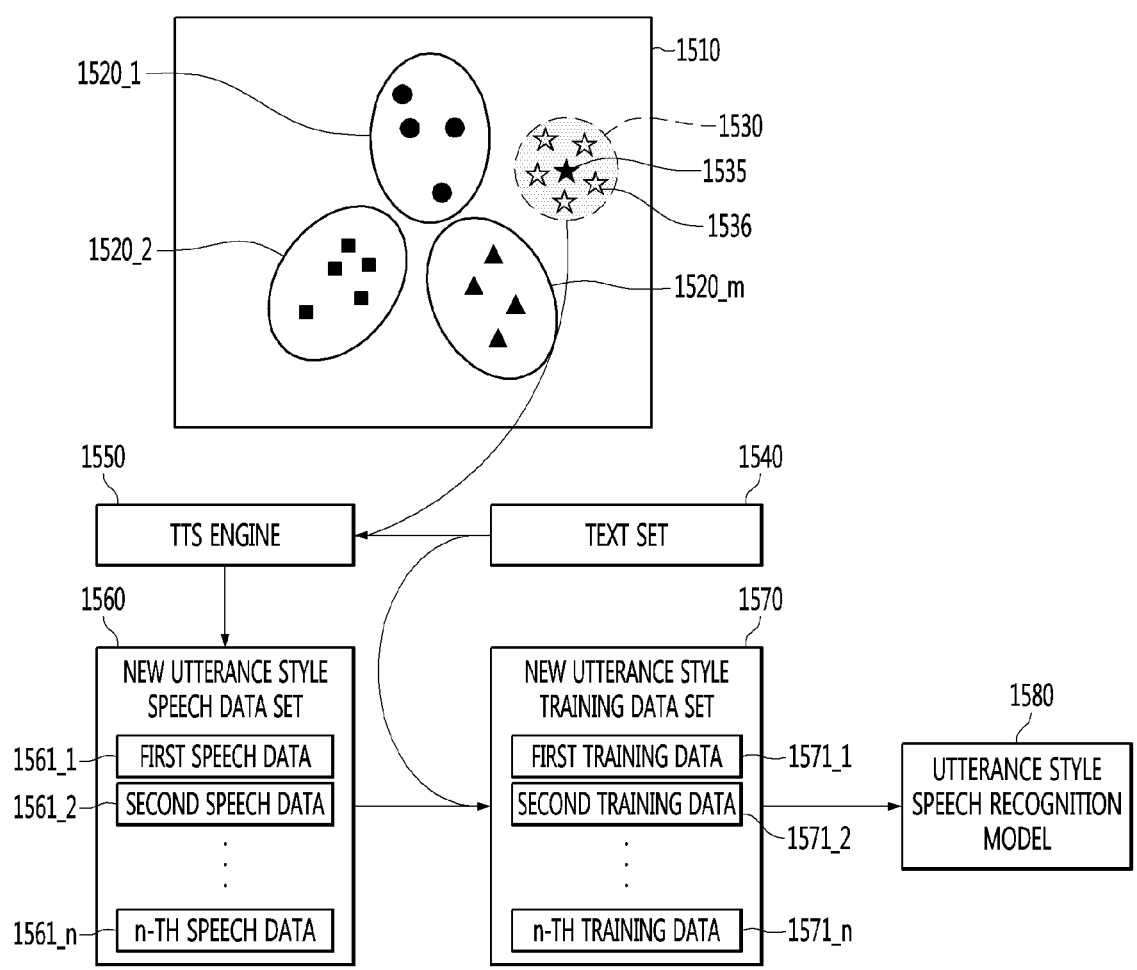

FIGS. 15 and 16 are views illustrating a method of learning a speech recognition model corresponding to a new utterance style according to an embodiment of the present disclosure.

Referring to FIG. 15, a feature space 1510 corresponding to the second utterance style determination model may include a plurality of clusters 1520_1, 1520_2 to 1520_m corresponding to previously learned utterance styles and a new cluster 1530 corresponding to a new utterance style. In addition, the new cluster 1530 may include a mapped utterance feature vector 1535 corresponding to a new utterance style.

The processor 180 or the learning processor 130 may generate one or more utterance feature vectors 1536 by changing some utterance feature items from the mapped utterance feature vector 1535 within the new cluster 1530. The generated one or more utterance feature vectors 1536 have differences from the mapped utterance feature vector 1535, which are less than a predetermined reference value. Accordingly, the generated one or more utterance feature vectors 1536 have the same utterance style as the mapped utterance feature vector 1535 and may be included in the same new cluster 1530.

Referring to FIG. 16, the processor 180 or the learning processor 130 generates a new utterance style speech data set 1560 from the utterance feature vectors 1535 and 1536 included in the new cluster 1530 corresponding to the new utterance style using a TTS engine 1550 and a text set 1540. For example, the processor 180 or the learning processor 130 may generate first speech data 1561_1 from the first utterance feature vector included in the new cluster 1530 and generate n-th speech data 1561_n from the n-th utterance feature vector included in the new cluster 1530, thereby generating the new utterance style speech data set 1560.

In addition, the processor 180 or the learning processor 130 may generate a new utterance style training data set 1570, by adding the text data 1540 to the generated new utterance style speech data set. For example, the processor 180 or the learning processor 130 may generate first training data 1571_1 from the first speech data 1561_1 and the text set 1540 and generate n-th training data 1571_$n$ from the n-th speech data 1561_$n$ and the text set 1540, thereby generating the new utterance style training data set 1560.

In addition, the processor 180 or the learning processor 130 may learn a speech recognition model 1580 corresponding to a new utterance style using the generated new utterance style training data set 1560. When the speech recognition model 1580 corresponding to the new utterance style is learned, the (new) cluster 1530 in the feature space 1510 corresponding to the learned speech recognition model 1580 may be treated equally to the clusters 1520_1, 1520_2 to 1520_$m$ corresponding to the previously learned utterance style when speech is recognized later.

For example, if speech recognition models corresponding to n utterance styles are previously learned, the speech included in the obtained speech data is different from the pre-learned n utterance styles and the utterance style of the speech data is determined as a new utterance style, the processor 180 or the learning processor 130 learns the speech recognition model 1580 corresponding to the utterance feature vector corresponding to the speech data. When speech recognition is performed later, speech recognition models corresponding to (n+1) utterance styles have been learned.

According to various embodiments of the present disclosure, by recognizing uttered speech using a speech recognition model corresponding to the utterance style of the uttered speech of the user, it is possible to increase speech recognition accuracy.

According to various embodiments of the present disclosure, even if speech having a new utterance style which has not been previously learned is obtained, by learning a speech recognition model corresponding to the new utterance style, it is possible to recognize speech even for speech data having the new utterance style which has not been previously learned.

According to an embodiment of the present disclosure, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

What is claimed is:

1. An artificial intelligence apparatus for recognizing speech in consideration of an utterance style, comprising:
   a microphone;
   a memory configured to store a plurality of speech recognition models corresponding to a plurality of utterance styles, respectively; and
   a processor configured to:
      obtain, via the microphone, speech data including speech of a user,
      extract an utterance feature vector from the obtained speech data,
      determine an utterance style corresponding to the speech based on the extracted utterance feature vector and an utterance style determination model,
      determine whether the determined utterance style corresponding to the speech is a new utterance style,
      based on a determination that the determined utterance style corresponding to the speech is not the new utterance style, generate a first speech recognition result by using a speech recognition model corresponding to the determined utterance style, the speech recognition model having been selected from among the plurality of speech recognition models stored in the memory,
   based on a determination that the determined utterance style corresponding to the speech is the new utterance style, generate a new speech recognition model and generate a second speech recognition result by using the generated new speech recognition model,
   wherein the processor is configured to:
      map the extracted utterance feature vector to an utterance feature space,
      determine a cluster closest to the mapped utterance feature vector among clusters corresponding to a plurality of previously learned utterance styles,
      determine the utterance style corresponding to the extracted utterance feature vector as an utterance style corresponding to the closest cluster based on a distance from the mapped utterance feature vector to the closest cluster being less than a predetermined reference value, the utterance style corresponding to the closest cluster being stored in the memory, and
      determine the utterance style corresponding to the utterance feature vector as a new utterance style based on the distance being equal to or greater than the predetermined reference value, wherein the utterance style corresponding to the closest cluster is not one of the plurality of speech recognition models stored in the memory.

2. The artificial intelligence apparatus of claim 1, wherein the speech recognition model is learned using training data including speech data corresponding to an utterance style corresponding to the speech recognition model.

3. The artificial intelligence apparatus of claim 1, wherein the first or second speech recognition result includes intent information corresponding to the speech.

4. The artificial intelligence apparatus of claim 1, wherein the utterance style determination model includes an artificial neural network and is learned using a machine learning algorithm or a deep learning algorithm.

5. The artificial intelligence apparatus of claim 1, wherein the processor is configured to:
   generate training data corresponding to the extracted utterance feature vector if the determined utterance style is a new utterance style,
   learn the new speech recognition model corresponding to the new utterance style using the generated training data, and
   generate the second speech recognition result corresponding to the speech using the learned new speech recognition model.

6. The artificial intelligence apparatus of claim 5, wherein the processor is configured to:
   generate speech data corresponding to the extracted utterance feature vector from a predetermined text set using a text-to-speech (TTS) engine, and
   generate training data including the predetermined text set and the generated speech data.

7. The artificial intelligence apparatus of claim 1, wherein the utterance feature vector includes at least one of a gender of a speaker, a speech speed, a pronunciation, a pronunciation stress, a pause interval, a pitch, a tone, an intonation, a rhyme or an emotion.

8. A method of recognizing speech in consideration of an utterance style, the method comprising:
   obtaining, via a microphone, speech data including speech of a user;
   extracting an utterance feature vector from the obtained speech data;
   determining an utterance style corresponding to the speech based on the extracted utterance feature vector and an utterance style determination model;
   determining whether the determined utterance style corresponding to the speech is a new utterance style;
   based on a determination that the determined utterance style corresponding to the speech is not the new utterance style, generating a first speech recognition result by using a speech recognition model corresponding to the determined utterance style, the speech recognition model having been selected from among a plurality of speech recognition models stored in a memory;
   based on a determination that the determined utterance style corresponding to the speech is the new utterance style, generating a new speech recognition model and generating a second speech recognition result by using the generated new speech recognition model,
   wherein the memory is configured to store the plurality of speech recognition models corresponding to a plurality of utterance styles, respectively, and
   wherein determining whether the determined utterance style corresponding to the speech is the new utterance style comprises:
      mapping the extracted utterance feature vector to an utterance feature space,
      determining a cluster closest to the mapped utterance feature vector among clusters corresponding to a plurality of previously learned utterance styles,
      determining the utterance style corresponding to the extracted utterance feature vector as an utterance style corresponding to the closest cluster based on a distance from the mapped utterance feature vector to the closest cluster being less than a predetermined reference value, the utterance style corresponding to the closest cluster being stored in the memory, and
      determining the utterance style corresponding to the utterance feature vector as a new utterance style based on the distance being equal to or greater than the predetermined reference value, wherein the utterance style corresponding to the closest cluster is not one of the plurality of speech recognition models stored in the memory.

9. A non-transitory computer-readable medium having recorded thereon a program for performing a method of recognizing speech in consideration of an utterance style, the method comprising:
   obtaining, via a microphone, speech data including speech of a user;
   extracting an utterance feature vector from the obtained speech data;
   determining an utterance style corresponding to the speech based on the extracted utterance feature vector and an utterance style determination model;
   determining whether the determined utterance style corresponding to the speech is a new utterance style;
   based on a determination that the determined utterance style corresponding to the speech is not the new utterance style, generating a first speech recognition result by using a speech recognition model corresponding to the determined utterance style, the speech recognition model having been selected from among a plurality of speech recognition models stored in a memory;
   based on a determination that the determined utterance style corresponding to the speech is the new utterance style, generating a new speech recognition model and generating a second speech recognition result by using the generated new speech recognition model,
   wherein the memory is configured to store the plurality of speech recognition models corresponding to a plurality of utterance styles, respectively, and
   wherein determining whether the determined utterance style corresponding to the speech is the new utterance style comprises:
      mapping the extracted utterance feature vector to an utterance feature space,
      determining a cluster closest to the mapped utterance feature vector among clusters corresponding to a plurality of previously learned utterance styles,
      determining the utterance style corresponding to the extracted utterance feature vector as an utterance style corresponding to the closest cluster based on a distance from the mapped utterance feature vector to the closest cluster being less than a predetermined reference value, the utterance style corresponding to the closest cluster being stored in the memory, and
      determining the utterance style corresponding to the utterance feature vector as a new utterance style based on the distance being equal to or greater than the predetermined reference value, wherein the utterance style corresponding to the closest cluster is not one of the plurality of speech recognition models stored in the memory.

* * * * *